Oct. 4, 1949.  S. WEINER ET AL  2,483,953
ADJUSTABLE MOUNTING FOR BABY CARRIAGE TOPS
Filed Dec. 15, 1947  2 Sheets-Sheet 1
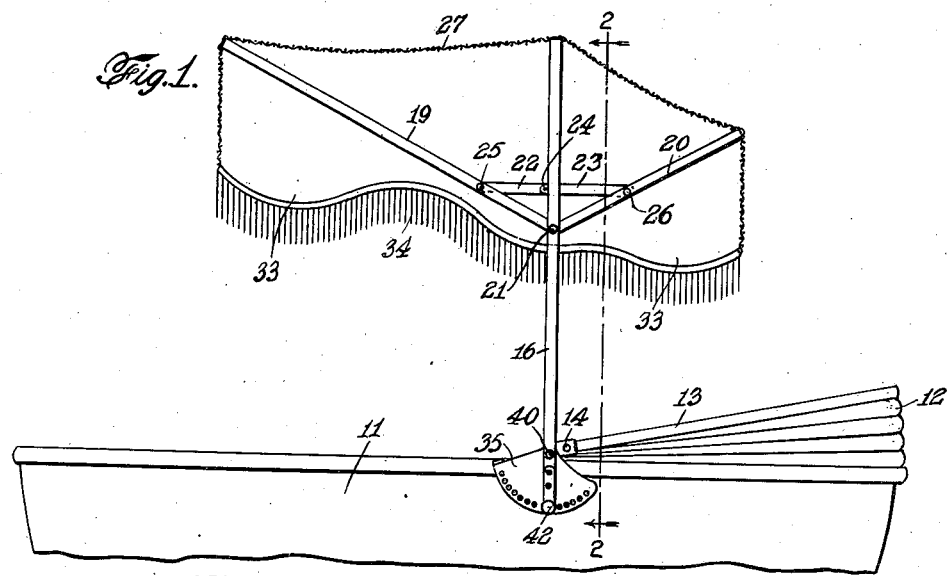
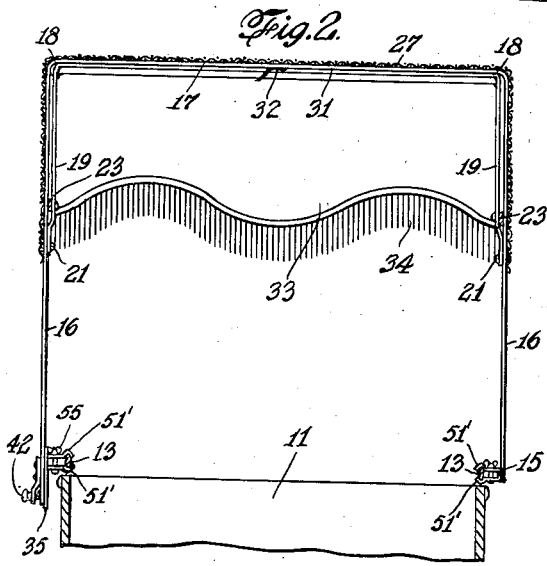
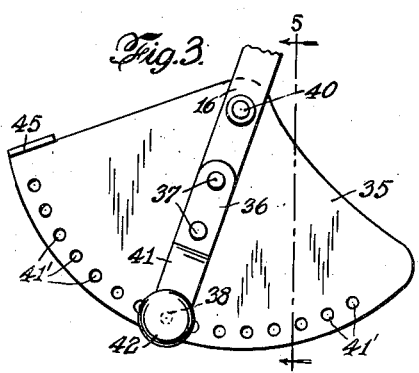
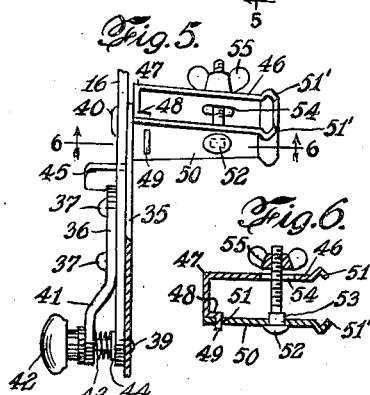
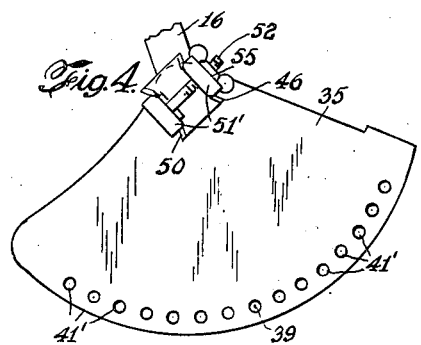
INVENTORS
SAMUEL WEINER AND
SIDNEY GOLDBLATT
BY
Peter M. Boesen
ATTORNEY.

Oct. 4, 1949.　　　　S. WEINER ET AL　　　　2,483,953
ADJUSTABLE MOUNTING FOR BABY CARRIAGE TOPS
Filed Dec. 15, 1947　　　　　　　　　　　　2 Sheets-Sheet 2
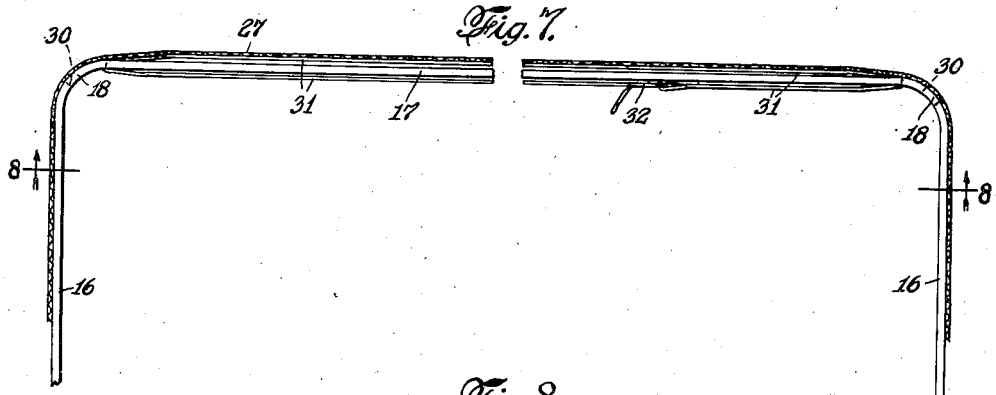
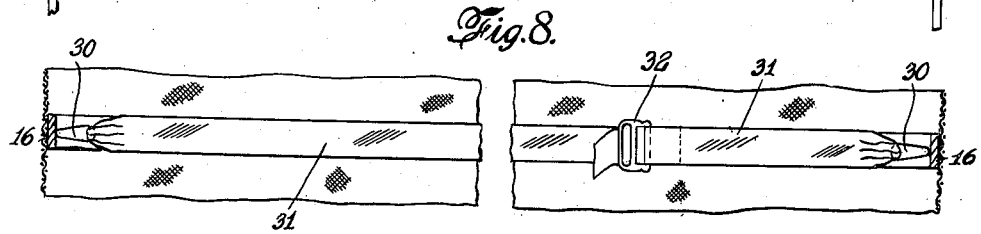
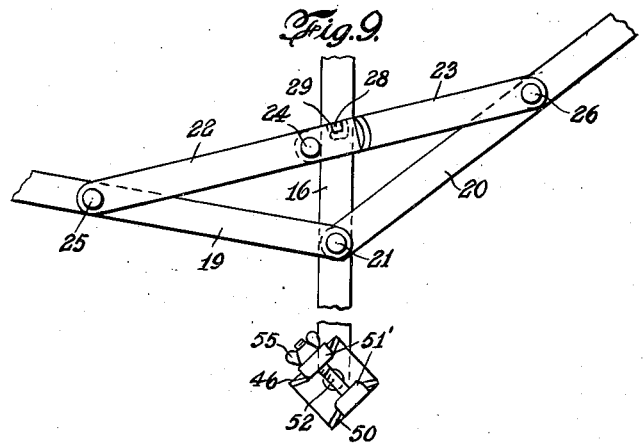
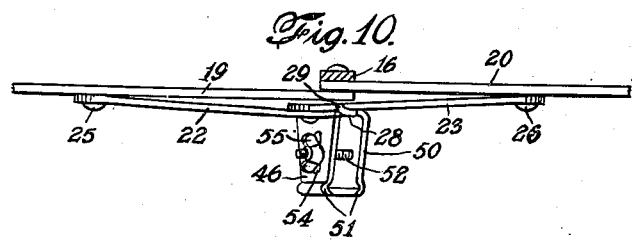
INVENTORS
SAMUEL WEINER AND
SIDNEY GOLDBLATT
BY
*Peter M. Boesen*
ATTORNEY.

Patented Oct. 4, 1949

2,483,953

UNITED STATES PATENT OFFICE 2,483,953

ADJUSTABLE MOUNTING FOR BABY CARRIAGE TOPS

Samuel Weiner and Sidney Goldblatt, New York, N. Y.

Application December 15, 1947, Serial No. 791,862

2 Claims. (Cl. 296—110)

The present invention set forth herein constitutes a further improvement of our invention for which we filed application Oct. 9, 1947, under Serial No. 778,986.

Thus the present invention relates to new and useful improvements in baby carriages, and it has for its object to provide a baby carriage with adjustable shading means so as to give comfort and protection to a child in the carriage by permitting air currents to pass, unobstructed over the carriage proper in hot weather, while at the same time protecting the child against the rays of the sun, as the said shading means will lend itself to suitable adjustment according to the direction of the wind or rays of the sun.

The purposes hereinbefore set forth are accomplished by the combination of an adjustable canopy with a baby carriage proper; said canopy may be made of any suitable material and lined with any desired kind of material, and may be shaped so as to obtain the best possible results under the conditions stated above; the canopy may be embellished with a border or fringes of any suitable design and color.

As the invention is comparatively simple of construction, the cost of manufacturing same will be proportionately low.

With the above and other objects in view, this invention consists of the novel features of construction, combination and arrangement of parts, hereinafter fully described, claimed and illustrated in the accompanying drawings forming part of this application, and in which similar characters of reference indicate corresponding parts in all views, and in which:

Figure 1 is a side elevational view of our designed canopy, in section showing also part of a baby cariage on which it is mounted.

Figure 2 is a transverse sectional view on the line 2—2 in Figure 1.

Figure 3 is a detail elevational view showing part of the adjusting mechanism.

Figure 4 is a rear elevation of an adjustment plate.

Figure 5 is a view taken on the line 5—5 in Figure 3.

Figure 6 is a section on the line 6—6 in Figure 5.

Figure 7 is an enlarged fragmental elevational view of a bow of the canopy frame.

Figure 8 is a section on the line 8—8 in Figure 7.

Figure 9 is an elevational view (with parts broken off) showing the stay-hinge in the frame structure.

Figure 10 is a top view of the parts shown in Figure 9.

Referring more particularly to the drawings, the numeral 11 indicates the crib or body of a baby carriage, which has the conventional collapsible hood 12 mounted on frames 13; said frames are pivotally secured by a bolt 14 to the carriage proper, while at the same time, one of the extreme ends 15, as shown in Figure 2, of said frames 13 is adapted to have uprights 16, 16 adjustably mounted thereon, as will be hereinafter further described.

The said uprights 16, 16 constitute a solid frame as they have integral therewith an upper frame portion 17, said parts 16, 16 and 17 forming round bends 18 at the upper corners.

Adjustable frame members 19, 20 are pivotally mounted on the uprights 16, 16, as shown at 21, short arms 22 and 23 are pivotally connected together as at 24 and connected to the respective frame members 19 and 20 as at 25 and 26. Said arms 22 and 23 are adapted, when in extended position, to keep the canopy cover 27 rigidly extended, as in this instance a cut out and bent lug 28 in the member 22 engages a recess 29 in the member 23, as shown in the latter in dotted lines in Figure 9.

The said frames are at their top provided with tear-drop holes 30, preferably at their corners; tapes 31 or strings attached to the canopy top and provided with buckles 32 are inserted through said holes 30 in the frames for securing the cover to the latter.

As stated before, when the tear-drop holes for receiving the tapes are situated at the corners of the frame a more snug fitting of the canopy cover is obtained, giving to the latter a streamlined appearance.

The said canopy cover may be formed with large tongues 33 and fringes 34.

An adjustable plate 35 is turnably mounted upon one of said upright frame members 16, as at 40.

An oblong rectangular strip 36 is rigidly secured to said frame members 16 by bolts 37, 37; said strip is at its lower end formed with an outwardly projecting bend 41 formed with a hole 38 therein. A pin 39 having an operating knob 42 is mounted in the hole 38, and adapted to selectively engage any of the apertures 41' in the plate 35.

A spring 43 is mounted upon the pin 39, while a washer 44 at the lower end of the spring and fast on said pin, secures the spring in position, and at the same time prevents the pin from plunging too deeply into the apertures 41'.

A lug 45 bent upon the adjustable plate 35 limits the movement of the upright 16.

There are two clamping members for securing the uprights 16, which carries the canopy to the end portion 15 of a conventional hood member 13. While said clamping members are constructed substantially alike, one is turnably attached directly upon the upright 16, as shown in Figure 2, while the other is fixedly secured to the adjustable plate 35.

Each of said clamping members comprises a main body 46 formed with double substantially rectangular bends 47, 48, as shown in Figure 5.

Integral with the shorter bend 48 of said main body is a projection 49; the supplemental body part 50 is formed with a hole 51 therein adapted to receive said projection 49 in such a manner that the said part 50 is loosely, that is adjustably, but securely held by said projection 49.

The said parts 46 and 50 constituting a clamping member are of a tapered shape, and formed with gripping jaws 51', 51'.

A screw bolt 52 having near its head a small square shank portion 53 is mounted in the member 50; said screw is received in a slot 54 in the member 46; said slot 54 is large enough to permit some play with respect to the bolt when the members 46 and 50 are clamped around the end frames 15, while a wing nut 55 mounted on the bolt 52 tightens the parts 46 and 50 together.

It is obvious that changes may be made in the form, construction and arrangement of the several parts, as shown, within the scope of the appended claims, without departing from the spirit of the invention, and we do not, therefore, wish to limit ourselves to the exact construction shown and described herein.

What we claim as new, and desire to secure by Letters Patent of the United States, is:

1. Means for adjusting the canopy of a baby carriage, comprising uprights, an adjustable plate formed with apertures therein and being turnably secured to one of said uprights, two clamping members connecting the uprights to said baby carriage, one of said clamping members being turnably mounted upon one of said uprights, the other clamping member being fixedly secured to the adjustable plate, each of said clamping members comprising a main body formed with double, substantially rectangular bends, one of said bends terminate in a short end portion, a projection formed upon the latter, a supplemental body having a hole therein adapted to receive said projection, whereby to secure said body parts loosely but inseparably together, a screw bolt having near its head a square-shaped shank portion and being mounted in the supplemental body, the main body having an enlarged slot adapted to receive loosely therein the free end of said screw bolt, and a wing-nut mounted upon the end of the latter, whereby to tighten the body parts together.

2. In a device, as claimed in claim 1, and wherein the clamping members are of a tapered shape and formed with gripping jaws.

SAMUEL WEINER.
SIDNEY GOLDBLATT.

REFERENCES CITED

The following references are of record in the file of this patent:

UNITED STATES PATENTS

| Number | Name | Date |
| --- | --- | --- |
| Re. 6,121 | Richardson | Nov. 3, 1874 |
| 194,061 | Thompson | Aug. 14, 1877 |
| 208,564 | Bowers | Oct. 1, 1878 |
| 381,945 | Mortz | May 1, 1888 |
| 606,773 | Sprague | July 5, 1898 |
| 1,305,515 | Bessolo | June 3, 1919 |
| 1,466,952 | Lindberg | Sept. 4, 1923 |
| 1,933,537 | Bjorson et al. | Nov. 7, 1933 |

FOREIGN PATENTS

| Number | Country | Date |
| --- | --- | --- |
| 622,807 | France | Mar. 7, 1927 |